US006478047B1

(12) United States Patent
Powell

(10) Patent No.: US 6,478,047 B1
(45) Date of Patent: Nov. 12, 2002

(54) BACKFLOW PREVENTION APPARATUS

(75) Inventor: Douglass H. Powell, Sacramento, CA (US)

(73) Assignee: Hunter Innovations, Inc., Sacramento, CA (US)

( * ) Notice: Subject to any disclaimer, the term of this patent is extended or adjusted under 35 U.S.C. 154(b) by 0 days.

(21) Appl. No.: 09/757,397

(22) Filed: Jan. 5, 2001

(51) Int. Cl.[7] ............................................. F16K 15/00
(52) U.S. Cl. ................ 137/512; 137/315.11; 137/454.6
(58) Field of Search ........................... 137/15.18, 218, 137/315.16, 315.33, 454.6, 512, 527, 315.11; 138/92, 94.3

(56) References Cited

U.S. PATENT DOCUMENTS

| 3,756,287 | A | * | 9/1973 | Bishop ........................ 138/92 |
| 4,893,654 | A | * | 1/1990 | Feuz ........................... 137/218 |
| 5,046,525 | A | * | 9/1991 | Powell ........................ 137/512 |
| 5,351,718 | A | * | 10/1994 | Barton ........................ 138/92 |
| 5,584,315 | A | * | 12/1996 | Powell .................... 137/15.18 |
| 5,785,077 | A | | 7/1998 | Rice ........................... 137/315 |
| 6,021,805 | A | * | 2/2000 | Horne et al. ................ 137/375 |
| 6,192,933 | B1 | * | 2/2001 | Engelmann ................. 137/512 |

* cited by examiner

Primary Examiner—John Rivell
Assistant Examiner—Ramesh Krishnamurthy

(74) Attorney, Agent, or Firm—Bozicevic, Field & Francis, LLP

(57) ABSTRACT

A backflow prevention apparatus of light weight, modular construction which provides quick and easy access to internal check valves. The backflow prevention apparatus generally comprises a tubular valve body having a lateral opening, at least one check valve positioned within the flow stream of the tubular valve body, a movable sleeve which fits over the valve body and is configured to cover the lateral opening in the valve body, and seals, associated with the sleeve valve body, for providing a fluid tight seal between the sleeve and valve body. The tubular valve body has openings at first and second ends, and the lateral opening is flangeless. Preferably, the backflow preventer includes a first, upstream check valve and a second, downstream check valve each having thereon a stop or ridge thereon. The upstream check valve fits within the lateral opening and is positioned adjacent an upstream edge thereof, with the stop on the upstream check valve fitting against or abutting the upstream edge of the lateral opening. The downstream check valve fits within the lateral opening and is positioned adjacent the downstream edge thereof, with the stop on the downstream check valve fitting against or abutting the downstream edge of the lateral opening. The sleeve is structured and configured to fit over the tubular valve body, and is slidably movable with respect to the valve body such that the sleeve can move between a first position in which the sleeve covers the lateral opening, and a second position in which the sleeve is moved away from the lateral opening and the lateral opening is exposed.

13 Claims, 6 Drawing Sheets

BACKFLOW PREVENTION APPARATUS

BACKGROUND OF THE INVENTION

1. Field of the Invention

The present invention pertains generally to devices, assemblies and systems for backflow prevention, and more particularly to a compact, light weight, low maintenance double check valve backflow prevention apparatus of modular construction.

2. Description of the Background Art

Backflow prevention devices are widely used to prevent undesirable flow reversal under low flow, static or backpressure situations wherein clean upstream fluid sources can be contaminated by downstream fluid. Backflow prevention devices typically comprise one or two check valves, housed within a valve body, which undergo closure under backflow, backpressure or back siphonage conditions. The use of backflow prevention devices is generally required by law for cross-connected water supplies where potable water could undergo contamination due to flow reversal or back pressure conditions.

An important drawback in currently used back flow preventer devices is the difficulty associated with accessing the internal check valves for maintenance and repair. Convention backflow prevention devices typically use a bulky, heavy cast housing with a side port tube or extension and a separately cast port cover. The check valves are typically bolted to seats or fixtures within the housing, and can only be reached through the side port tube, which hinders access to the check valves. Maintenance and replacement of the check valves requires a person to reach through the side port tube and loosen bolts, compression rods or other internal hardware in order to remove the check valves, and thus tends to be a difficult and expensive operation. This type of cast housing additionally is expensive to manufacture and requires a substantial amount of space to accommodate the side port tube and cover.

Accordingly, there is a need for a backflow prevention apparatus which is compact and light weight, which is easy and inexpensive to manufacture, which does not have a side port tube, and which provides easy access to internal check valves. The present invention satisfies these needs, as well as others, and generally overcomes the deficiencies found in the background art.

SUMMARY OF THE INVENTION

The invention is a backflow prevention apparatus of light weight, modular construction which provides quick and easy access to internal check valves. In its most general terms, the invention comprises a tubular valve body having a lateral opening, at least one check valve positioned within the flow stream of the tubular valve body, a movable sleeve which fits over the valve body and is configured to cover the lateral opening in the valve body, and seal means, associated with the sleeve and valve body, for providing a fluid tight seal between the sleeve and valve body.

By way of example, and not of limitation, the tubular valve body has openings at first and second ends, and the lateral opening is flangeless. Preferably, the backflow preventer comprises a first, upstream check valve and a second, downstream check valve each having thereon a stop or ridge thereon. The check valves may be clapper-type check valves, poppet check valves, or any other conventional fluid check valve. The upstream check valve fits within the lateral opening and is positioned adjacent an upstream edge thereof, with the stop on the upstream check valve fitting against or abutting the upstream edge of the lateral opening. The downstream check valve fits within the lateral opening and is positioned adjacent the downstream edge thereof, with the stop on the downstream check valve fitting against or abutting the downstream edge of the lateral opening. Preferably, one or more spacers or compression rods are positioned between the upstream and downstream check valves to hold the check valves in position.

In the preferred embodiments, the sleeve is structured and configured to fit over the tubular valve body, and is slidably movable with respect to the valve body such that the sleeve can move between a first position in which the sleeve covers the lateral opening, and a second position in which the sleeve is moved away from the lateral opening and the lateral opening is exposed. The sleeve may include external annular flanges to facilitate manipulation of the sleeve on the valve body. In other embodiments, the sleeve may be longitudinally split so that two halves of the sleeve fit over the valve body and come together in a "clamshell" arrangement.

Preferably, a vent element with a threaded portion is used to secure the sleeve to an internal spacer positioned between the check valves when the sleeve is positioned to cover the lateral opening. The sleeve may alternatively be secured in position by means of on or more bolts or fasteners which secure the sleeve to the tubular valve body or to a spacer element positioned under the sleeve.

The seal means associated with the sleeve preferably comprises first and second annular seals which extend around the inner surface of the sleeve and sealingly engage the valve body. Preferably, one annular seal is positioned adjacent an upstream edge of the sleeve, and the other annular seal is positioned adjacent a downstream edge of the sleeve, so that when the sleeve is positioned over the lateral opening, the sleeve and annular seals define a fluid tight cover for the lateral opening. The seals means may alternatively comprise annular seals located on the outer surface of the valve body which sealingly engage the sleeve when the sleeve is positioned over the lateral opening.

In order to access the check valves in the valve body, the vent element is unthreaded and the sleeve is slidably moved to expose the lateral opening in the valve housing. The spacer holding the check valves in place is removed, and the check valves are removed from the valve housing via the lateral opening. Since the lateral opening does not have a side extension or flange, the check valves are easy to reach, and no further disassembly is required for detaching and removing the check valves. The apparatus is easily re-assembled by replacing the check valves in position against the upstream and downstream edges of the lateral opening, placing the spacer between the check valves, and sliding or moving the sleeve back into position over the lateral opening.

An object of the invention is to provide a backflow prevention apparatus which is compact and light weight.

Another object of the invention is to provide a backflow prevention apparatus which is easy and inexpensive to manufacture.

Another object of the invention is to provide a backflow prevention apparatus of modular construction.

Another object of the invention is to provide a backflow prevention apparatus which does not have a side port tube.

Another object of the invention is to provide a backflow prevention apparatus which does not require a formed port cover.

Another object of the invention is to provide a backflow prevention apparatus which allows quick and easy access to check valves for service, repair and replacement.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
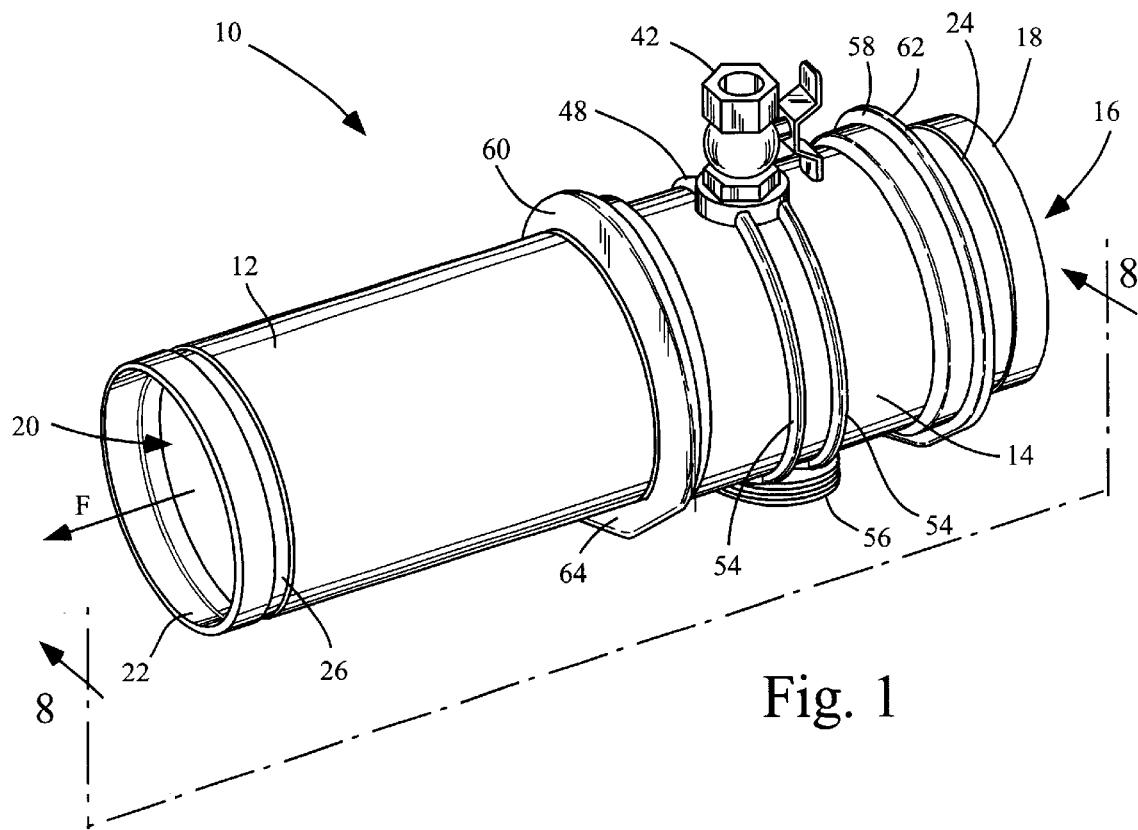
FIG. 1 is a perspective view of a backflow prevention apparatus in accordance with the present invention.
Figure 2:
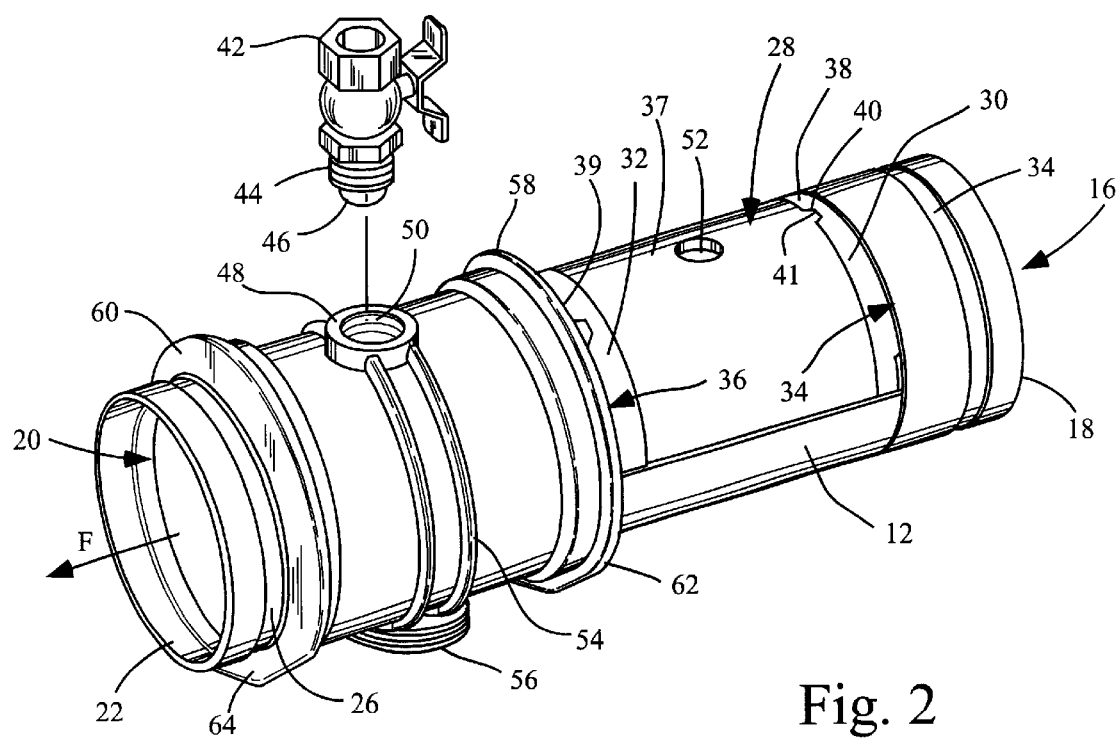
FIG. 2 is a perspective view of the backflow prevention apparatus of FIG. 1 shown with the vent removed, the sleeve positioned away from the lateral opening of the valve body.

Referring more specifically to the drawings, for illustrative purposes the present invention is embodied in the apparatus shown generally in FIG. 1 through FIG. 9. It will be appreciated that the apparatus may vary as to configuration and as to details of the parts without departing from the basic concepts as disclosed herein. The invention is disclosed generally in terms of backflow prevention. However, it will be readily apparent to those skilled in the art that the invention may be applied in various situations wherein check valves are used to interrupt fluid flow under selected conditions.

Referring now to FIG. 1 through FIG. 8, a presently preferred embodiment backflow prevention apparatus 10 in accordance with the invention is shown.

The backflow preventer 10 includes a generally tubular valve housing 12, and a sleeve or cover 14 which slidably fits over valve housing 12. Sleeve 14 preferably has an internal diameter which is slightly larger than the external diameter of housing 12. Valve housing 12 includes an upstream opening 16 adjacent a first or upstream end 18, a downstream opening 20 adjacent a second or downstream end 22, and an outer surface 23. Coupling grooves 24, 26 are included on housing 12 adjacent upstream and downstream ends 18, 22 to allow facile coupling of the apparatus 10 into a fluid flow stream. A fluid channel or passage 27 extends through valve housing 12. Fluid flow through the backflow preventer apparatus 10 moves generally from upstream to downstream as indicated by arrow F.

Figure 3:
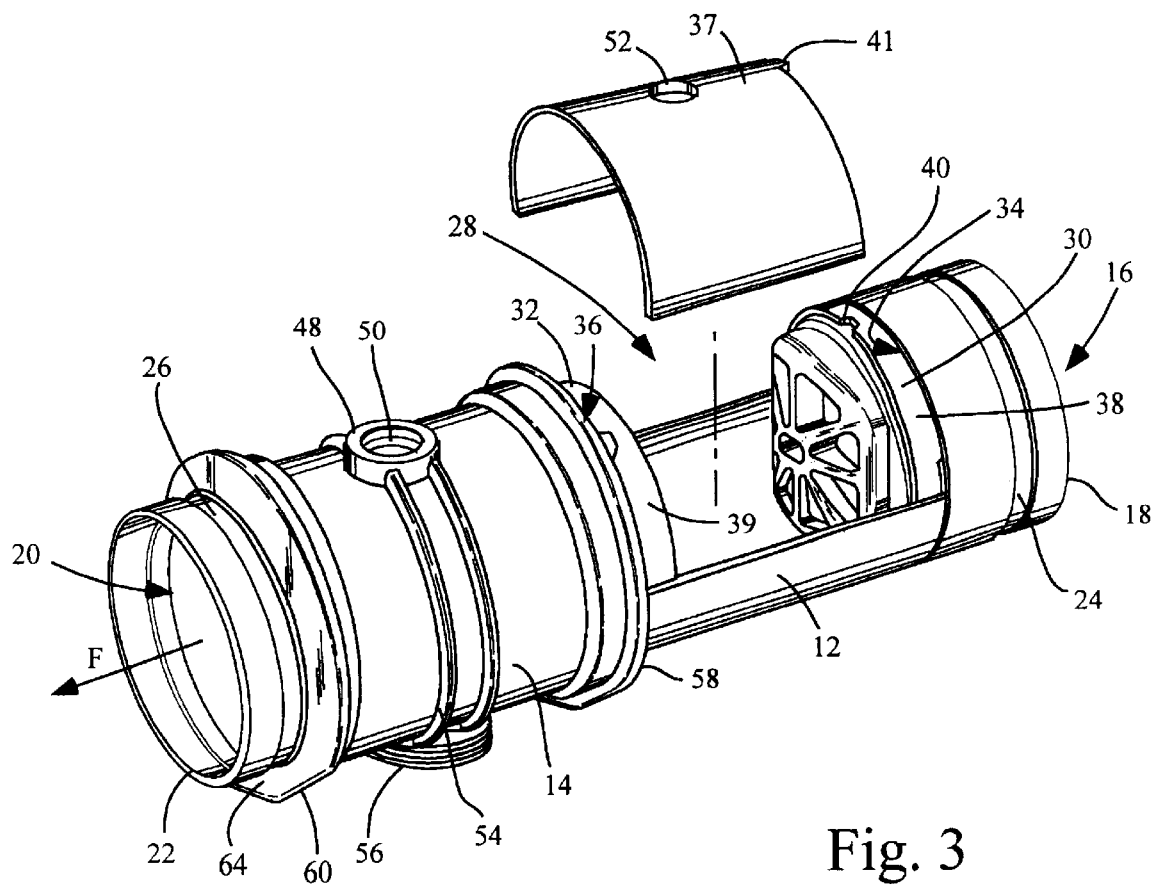
FIG. 3 is a perspective view of the backflow prevention apparatus of FIG. 2 shown with the spacer removed.
Figure 4:
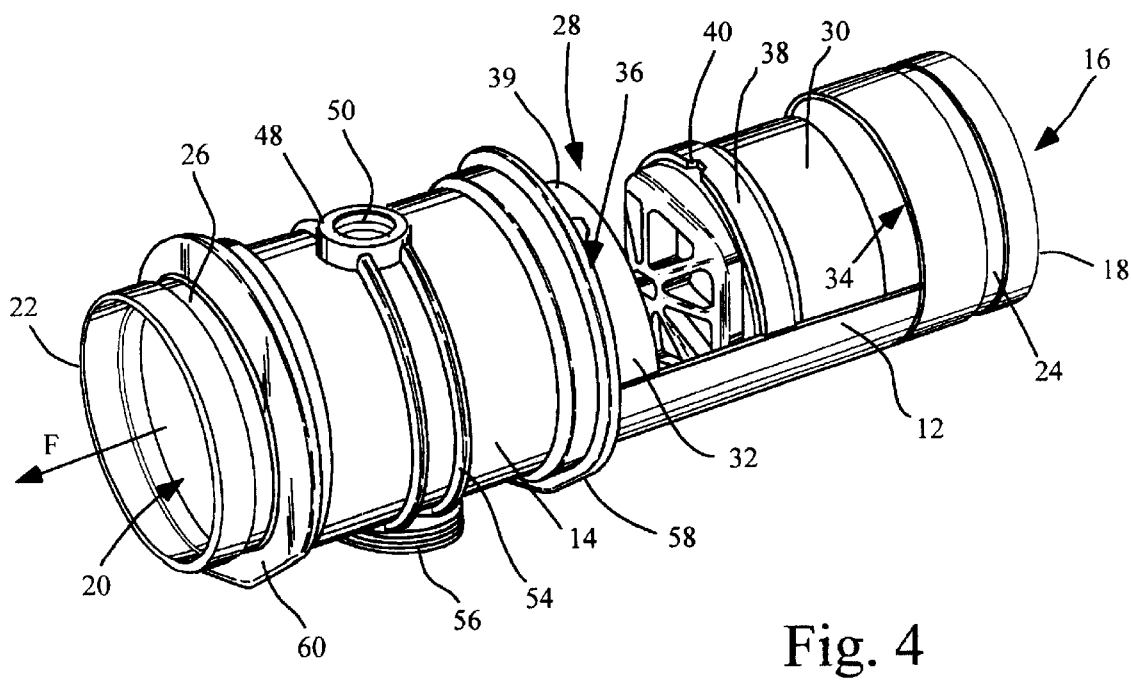
FIG. 4 is a perspective view of the backflow prevention apparatus of FIG. 3 shown with the upstream check valve moved into the lateral opening of the valve body.
Figure 5:
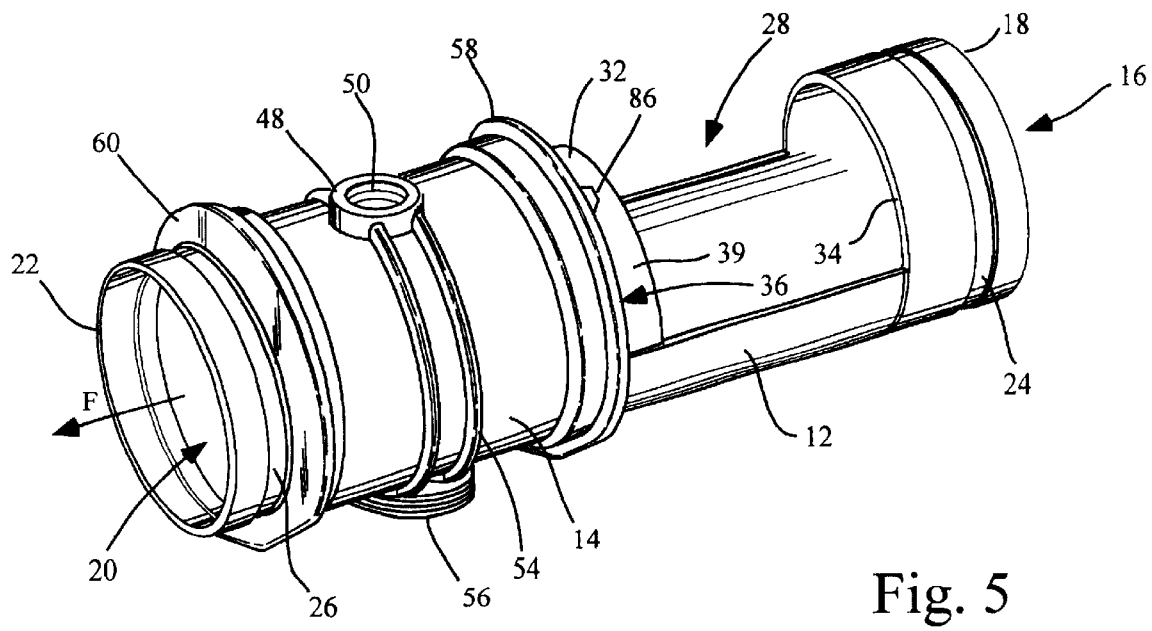
FIG. 5 is a perspective view of the backflow prevention apparatus of FIG. 4 shown with the upstream check valve removed.
Figure 6:
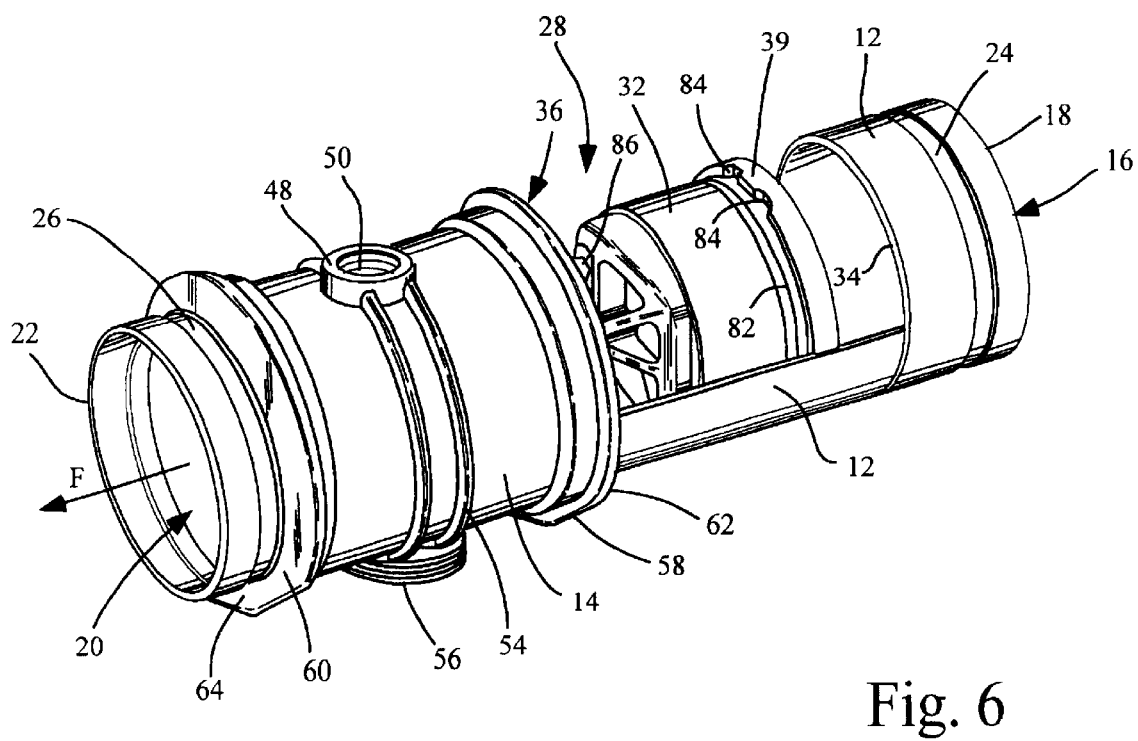
FIG. 6 is a perspective view of the backflow prevention apparatus of FIG. 5 shown with the downstream check valve moved into the lateral opening of the valve body.

Valve housing 12 also includes a side or lateral opening 28, seen most clearly in FIG. 3 and FIG. 5. Sleeve 14 is slidably movable on housing 12 between a first position wherein sleeve 14 covers lateral opening 28, as shown in FIG. 1, and a second position wherein lateral opening 28 is exposed or uncovered, as shown in FIG. 2 through FIG. 6. Sleeve 14 includes an inner surface (not shown) which fits generally adjacent the outer surface 23 of housing 12. Lateral opening 28 is preferably flangeless as shown, and sleeve 14 provides a cover for lateral opening 28.

The backflow prevention apparatus 10 includes a first, upstream check valve 30 and a second, downstream check valve 32, which are respectively positioned adjacent an upstream edge 34 and a downstream edge 36 of lateral opening 28. A spacer 37 holds check valves 30, 32 apart and in place against edges 34, 36 of lateral opening 28, as seen most clearly in FIG. 2. Upstream check valve 30 includes a stop or lip 38 which abuts spacer 37 and upstream edge 34 of lateral opening 28, and downstream check valve 32 similarly includes a stop or lip 39 which abuts spacer 37 and downstream edge 36 of lateral opening 28. When sleeve 14 is positioned over lateral opening, the check valves 30, 32 and spacer 37 are covered by sleeve 14. Preferably, a notch 40 is provided in stop 39, and a corresponding protrusion 41 is provided on spacer 37, to facilitate the alignment and positioning of spacer 37 between check valves 30, 32.

The backflow preventer 10 includes a hand-actuated vent element 42. When sleeve 14 is positioned to cover lateral opening 28 in housing 12, means for fastening sleeve 14 in place are provided by a hand actuated vent element 42, which includes a threaded section 44 (FIG. 2) and an inner end 46. Sleeve 14 includes an internally threaded coupling element 48 located on the top of sleeve 14, that communicates with an internally threaded bore 50 which extends through sleeve 14. Spacer 38 also includes a bore 52 which extends therethrough, and when sleeve 14 is properly positioned over spacer 38 the bore 50 in sleeve 14 is aligned with the bore 52 in spacer. When thus aligned, the threaded portion of vent 42 can threadably engage coupling element 48 and bore 50 in sleeve 14, with the end 46 of vent 42 fitting into opening 52 in spacer 38 to hold sleeve 14 in place over lateral opening 28.

The internally threaded coupling element 48 on top of sleeve 14 is joined to a compression band 54 which extends circumferentially around sleeve 14. An externally threaded bolt 56 on the bottom of sleeve 14 is configured to receive a corresponding nut (not shown) which may be tightened onto bolt 56 to tighten compression band 54. Sleeve also preferably includes lips or flanges 58, 60 respectively adjacent to the upstream and downstream ends 62, 64 of sleeve 14 to facilitate hand manipulation of sleeve 14.

Figure 7:
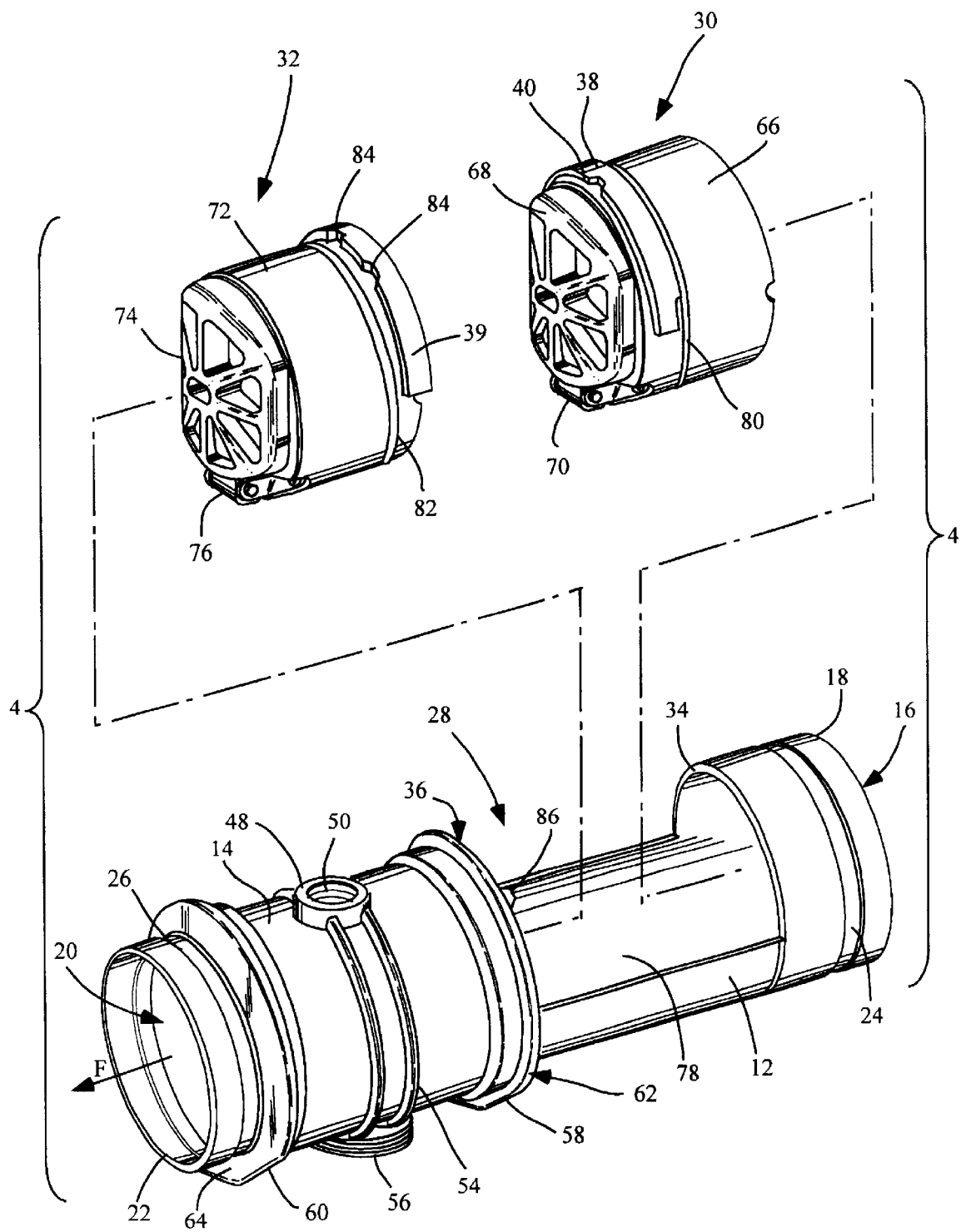
FIG. 7 is a partially exploded perspective view of the backflow prevention apparatus of FIG. 1.
Figure 8:
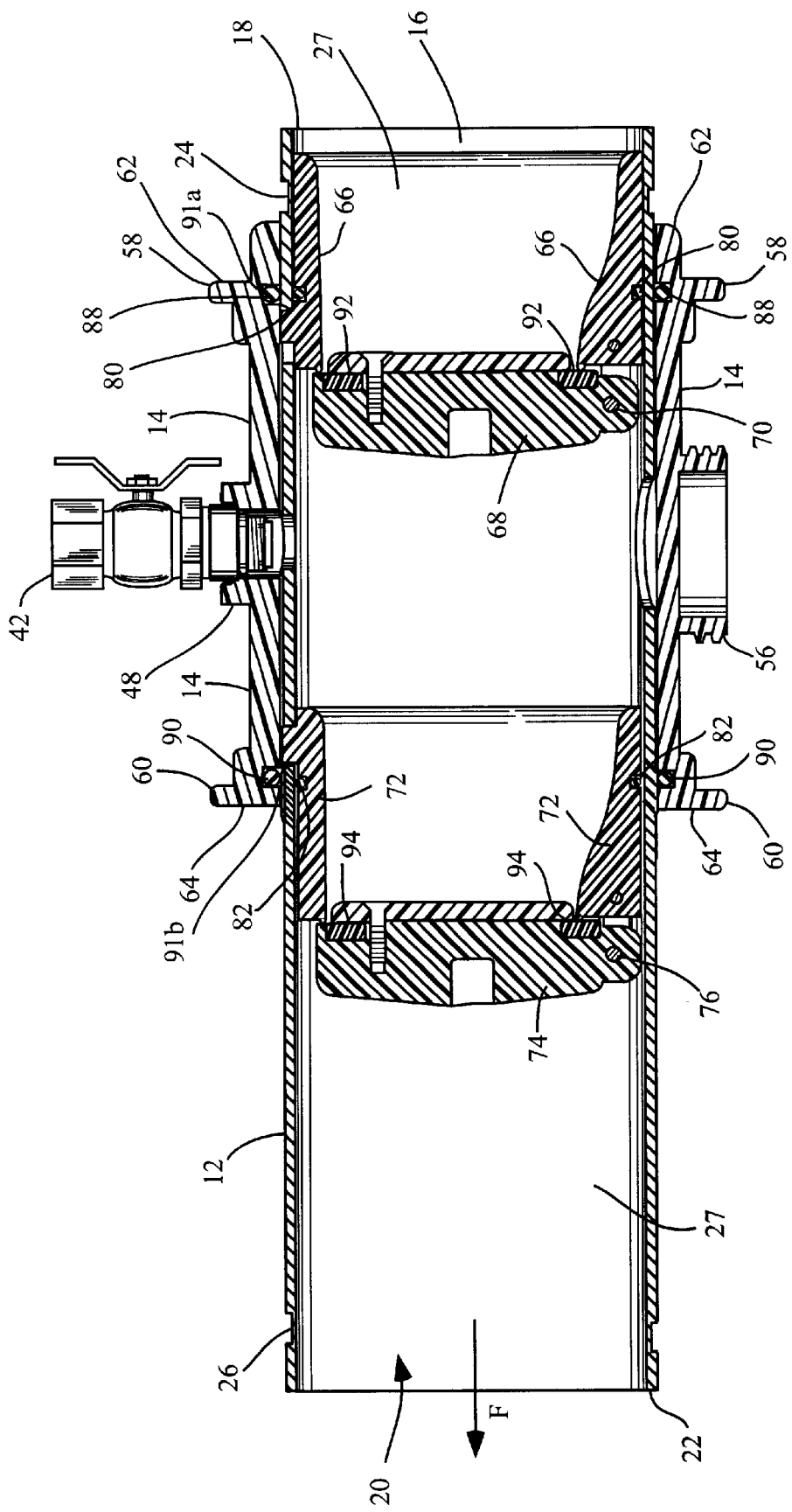
FIG. 8 is a partial cross-sectional view of the backflow prevention apparatus of FIG. 1 shown through line 8—8.

Referring more particularly to FIG. 7 and FIG. 8, upstream check valve 30 includes generally a valve seat 66 and a clapper 68 pivotally coupled to the valve seat 66 by a hinge element 70. Downstream check valve 32 likewise includes a valve seat 72 with a clapper 74 pivotally coupled thereto by a hinge element 76. Preferably, clappers 68, 74 are hinged to their respective valve seats 66, 72 proximate to the bottom edge thereof. Clappers 68, 74 and valve seats 66, 72 are preferably structured and configured such that clappers 68, 74 can open to relatively wide angle with respect seats 66, 72.

Valve seats 66, 72 are annular in shape and have external surfaces which are structured and configured such that valve seats 66, 72 are slidably received by the internal bore 78 of valve housing 12. Valve seat 66 includes an annular seal or o-ring 80 which is structured and configured to sealingly engage valve housing 12 when valve seat 66 is positioned within the bore 78 of housing 12. Valve seat 72 likewise includes an annular seal or o-ring 82 which sealingly engages housing 12 when valve seat 72 is engaged in bore 78. The lip or stop 39 on valve seat 72 preferably includes notches 84 which are structured and configured to engage corresponding protrusions 86 on upstream edge 36 of lateral opening 28, to ensure that check valve 32 is properly positioned when valve seat 72 engages the bore 78 of housing 12. Check valve 30 includes a notch 40 on stop 38 which accommodates a corresponding protrusion 41, to provide for alignment of check valve 30, as noted above.

Referring more particularly to FIG. 8, sleeve 14 includes a first annular seal 88 proximate to upstream edge 62 and a second annular seal 90 located proximate to downstream edge 64. Seals 88, 90 extend circumferentially around the inner surface of sleeve 14, and sealingly engage sealing surfaces 91a, 91b (FIG. 8) on the outer surface 23 of valve housing 12. Thus, when sleeve 14 is positioned over lateral opening 28, sleeve 14 and seals 88, 90 provides a fluid tight cover for lateral opening 28, and sleeve 14 and housing 12, together with seals 88, 90, define a complete, fluid tight valve body for the backflow apparatus 10.

Spacer 37 does not require use of any seals therewith, as spacer 37 is required only to hold check valves 30, 32 in their proper positions, and spacer 37 does not form part of the fluid tight cover provided by sleeve 14, or part of the fluid tight valve body defined by sleeve 14 and housing 12. The arcuate shape of spacer 37 generally matches the size and shape of lateral opening 28 because, during manufacture, the section of valve housing 12 which is cut away to form side opening 28 can conveniently be re-used as spacer 37, which reduces cost and manufacturing time.

The check valves 30, 32 shown with the invention are clapper-type check valves. It should be readily understood, however, that any type of check valve may be utilized with the invention, including poppet-type check valves and other fluid check valves. Any sort of valve closure mechanism can be used in association with clappers 68, 74 such that clappers 68, 74 are biased towards a closed position wherein seals 92, 94 on clappers 68, 74 respectively sealingly engage corresponding valve seats 66, 72, as shown in FIG. 8. Numerous valve closure mechanisms based on the use of springs, magnets or other bias elements to exert a valve closure force are well known in the art and are suitable for use with the present invention. Generally, the check valves used with the invention should be structured and configured to fit within the bore 78 of valve housing such that sleeve 14 can slidably move over and cover lateral opening 28. Preferably, the check valves include stops as described above to facilitate positioning of the check valves adjacent the upstream and downstream edges 34, 36 of lateral opening, and to facilitate the positioning of a spacer 37 between the check valves.

The modular nature of the backflow prevention apparatus 10 allows it to be quickly and easily assembled. Sleeve 14 is movable between a closed position wherein lateral opening 28 is covered, as shown in FIG. 1 and FIG. 8, and an open position or positions, as shown in FIG.2 through FIG. 7. In assembling the backflow preventer 10, sleeve 14 is slidably moved with respect to valve housing 12 so that lateral opening 28 in valve housing is exposed or uncovered, as seen most clearly in FIG. 7. Check valve 32 is placed in lateral opening 28 and positioned within the bore 78 of housing 12, and check valve 32 is moved towards the downstream edge 36 of lateral opening, with valve seat 72 sliding downstream within bore 78 until stop 39 abuts or comes to rest against downstream edge 36 of lateral opening 28, as seen most clearly in FIG. 6 and FIG. 5. Protrusions 86 in downstream edge 36 engage corresponding notches in stop 39, so that check valve 32 is properly oriented. When thusly positioned, seal 82 is positioned to provide a fluid tight sealing relationship between valve seat 72 and valve housing 12.

In a similar fashion, check valve 30 is placed within lateral opening 28 and positioned within the bore 78 of housing, and check valve 30 is moved upstream, with valve seat 66 sliding upstream within bore 78, until stop 38 abuts or comes to rest against upstream edge 34 of lateral opening 28, as seen most clearly in FIG. 4 and FIG. 3. Spacer 37 is then positioned between the stops 38, 29 to hold check valves 30, 32 in place, as seen most clearly in FIG. 2 and FIG. 3. Spacer 37 includes a protrusion 41 which engages a corresponding notch 40 in stop 38, to ensure that spacer 37 is properly positioned. Once spacer 37 is thus positioned, sleeve 14 is slidably moved along valve body 12 until sleeve 14 covers lateral opening 28, spacer 37 and check valves 30, 32, with the bore 50 in sleeve 14 being aligned with bore 52 in spacer 37. Then, the end 46 of vent 42 is inserted through bores 50, 52, and the threaded portion 44 of vent 42 is engaged in the corresponding threaded section 48 on sleeve 14, to hold sleeve 14 in place on valve housing 12.

When the back flow preventer 10 undergoes maintenance, a user can access check valves 30, 32 by loosening and removing vent 42 from bores 52, 50, sliding sleeve 14 back to expose lateral opening 28, removing spacer 37, and then disengaging check valves 30, 32 from the bore 78 of valve housing.

Figure 9:
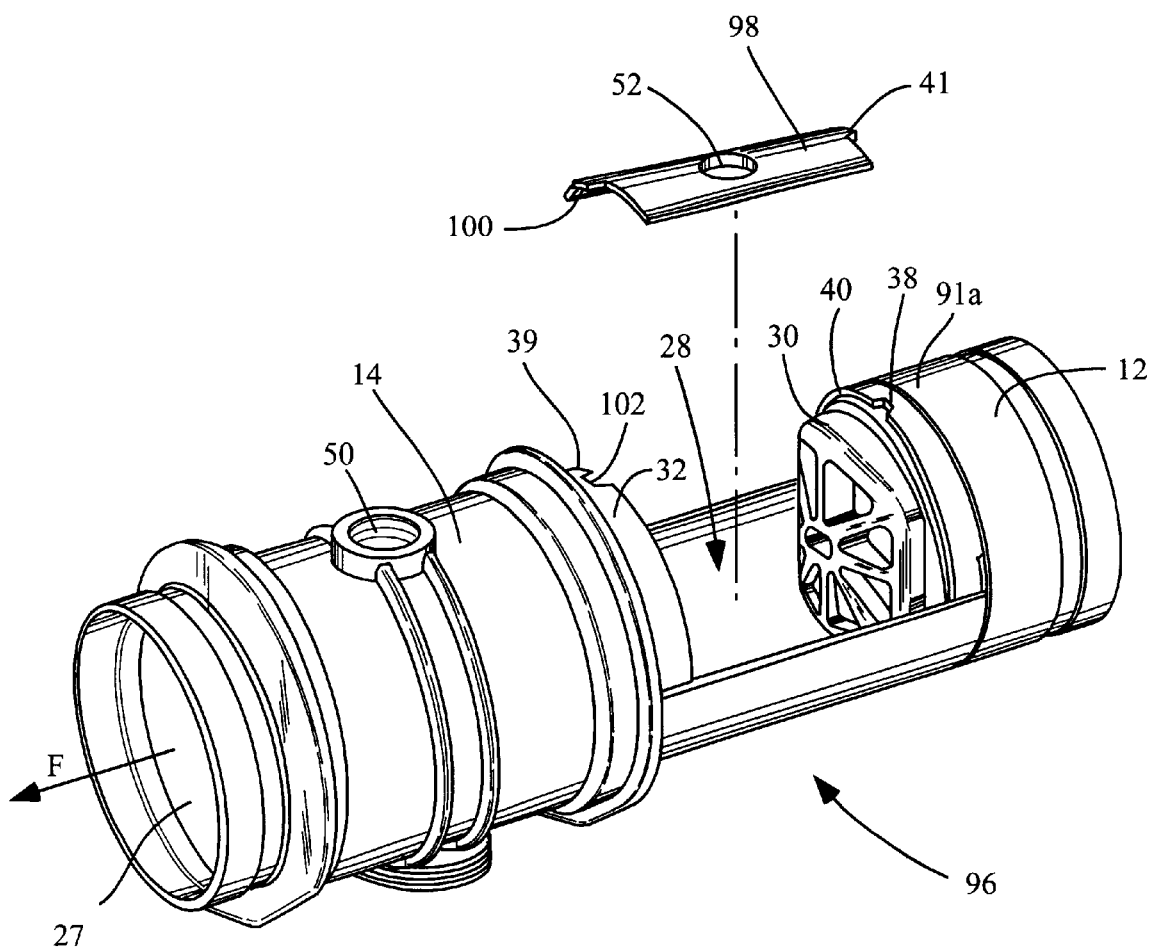
FIG. 9 is a perspective view of an alternative embodiment backflow prevention apparatus in accordance with the invention.

Referring now to FIG. 9, there is shown an alternative embodiment backflow prevention apparatus 96 in accordance with the invention, wherein like reference numbers are used to denote like parts. In the apparatus 96, a relatively small spacer 98 is used to hold check valves 30, 32 in place in generally the same manner as described above for spacer 37. The spacer 98 is more compact and light weight than spacer 37, and is preferred in some embodiments of the invention. Spacer 98 includes a protrusion 100 which engages a corresponding notch 102 in stop 39 in a similar manner as protrusion 41 engages notch 40 in stop 38. In all other respects, the apparatus 96 operates in the same manner as described above for the apparatus 10.

Accordingly, it will be seen that this invention provides a double check valve backflow prevention apparatus of lightweight, compact, modular construction which allows quick and easy access to internal check valves for maintenance or repair. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A backflow prevention apparatus, comprising:
    (a) a valve housing having a fluid passage extending therethrough, said valve housing including a lateral opening;
    (b) at least one check valve positioned within said valve housing in said fluid passage;
    (c) a sleeve configured to fit around and receive said valve housing and cover said lateral opening; and (d) at least one seal means for maintaining a fluid-tight seal between said valve housing and said sleeve, said seal means circumferentially engaging said valve housing and said sleeve.

2. The backflow prevention apparatus of claim 1, wherein said sleeve is configured to slidably fit over said valve housing.

3. The backflow prevention apparatus of claim 1, wherein said at least one seal means comprises;

(a) a first seal means for maintaining a fluid-tight seal, said first seal means positioned adjacent an upstream edge of said lateral opening and configured to circumferentially engage an outer surface of said valve body and an inner surface of said sleeve, and (b) a second seal means for maintaining a fluid-tight seal, said second seal means positioned adjacent a downstream edge of said lateral opening and configured to circumferentially engage said outer surface of said valve body and said inner surface of said sleeve.

4. The backflow prevention apparatus of claim 3, wherein said valve body further comprises;

(a) a first sealing surface on said outer surface adjacent said upstream edge of said lateral opening, said first seal means associated with said first sealing surface, and (b) a second sealing surface on said outer surface adjacent said downstream edge of said lateral opening, said second seal means associated with said second sealing surface.

5. A backflow prevention apparatus, comprising:

(a) a valve housing having a fluid passage extending therethrough, said valve housing including a lateral opening, said valve housing including an outer surface;

(b) at least one check valve positioned within said valve housing in said fluid passage;

(c) a tubular sleeve configured to fit over said valve housing and cover said lateral opening, said sleeve including an inner surface; and (d) seal means for maintaining a fluid-tight seal between said valve housing and said sleeve, said seal means circumferentially engaging said outer surface of said valve housing and said inner surface of said sleeve.

6. The backflow prevention apparatus of claim 5, wherein said seal means is positioned adjacent an upstream edge of said lateral opening and adjacent a downstream edge of said lateral opening.

7. The backflow prevention apparatus of claim 6, wherein said valve housing includes sealing surfaces positioned adjacent said upstream and downstream edges of said lateral opening, said sealing surfaces extending circumferentially around said outer surface of said valve housing, said seal means associated with said sealing surfaces.

8. A backflow prevention apparatus, comprising:

(a) a valve housing have a fluid channel, said housing including a lateral opening with an upstream edge and a downstream edge;

(b) a first check valve positioned within said valve housing in said fluid channel adjacent said upstream edge;

(c) a second check valve positioned within said valve housing in said fluid channel adjacent said downstream edge;

(d) a sleeve configured to fit over said valve body and cover said lateral opening;

(e) a first annular seal fitting circumferentially around said valve body adjacent said upstream edge of said lateral opening, said first annular seal configured to sealingly engage said valve housing and said sleeve; and (f) a second annular seal fitting circumferentially around said housing adjacent said downstream edge of said lateral opening, said second annular seal configured to sealingly engage said valve housing and said sleeve.

9. The backflow prevention apparatus of claim 8, wherein said valve housing includes an outer surface and said sleeve includes an inner surface, said first and second annular seals configured to sealingly engage said outer surface of said valve housing and said inner surface of said sleeve.

10. The backflow prevention apparatus of claim 9, wherein said valve housing includes a first sealing surface positioned adjacent said upstream edge of said lateral opening and a second sealing surface positioned adjacent said downstream edge of said lateral opening, said first and second sealing surfaces extending circumferentially around said outer surface of said valve housing, said first annular seal positioned adjacent said first sealing surface, said second annular seal positioned adjacent said second sealing surface.

11. A backflow prevention apparatus, comprising:

(a) a valve housing have a fluid channel, said housing including a lateral opening with an upstream edge and a downstream edge;

(b) a first check valve positioned within said valve housing in said fluid channel adjacent said upstream edge;

(c) a second check valve positioned within said valve housing in said fluid channel adjacent said downstream edge;

(d) a sleeve configured to fit over said valve body and cover said lateral opening;

(e) a first annular seal fitting circumferentially around said valve body adjacent said upstream edge of said lateral opening, said first annular seal configured to sealingly engage said valve housing and said sleeve; and (f) a second annular seal fitting circumferentially around said housing adjacent said downstream edge of said lateral opening, said second annular seal configured to sealingly engage said valve housing and said sleeve, wherein said first check valve includes a stop configured to abut an upstream edge of said lateral opening, said second check valve includes a stop configured to abut said downstream edge of said lateral opening.

12. The backflow prevention apparatus of claim 8, further comprising at least one spacer, said spacer configured to hold said first check valve against said upstream edge of said lateral opening and said second check valve against said downstream edge of said lateral opening.

13. A backflow prevention apparatus, comprising:

(a) a valve housing component, said valve housing component having a central channel for passage of fluid, said valve housing having at least one exterior sealing surface, said valve housing component having a lateral opening;

(b) a first check valve assembly, said first check valve assembly fitting within said lateral opening;

(c) a second check valve assembly, said second check valve assembly fitting within said lateral opening;

(d) a sleeve housing component, said sleeve housing component having an internal bore configured to receive said valve housing component, said sleeve component having a first end and a second end;

(e) first seal means for maintaining a fluid tight seal between said valve housing component and said sleeve component, said first seal means configured to circumferentially engage said exterior sealing surface of said valve housing component adjacent said first end;

(f) second seal means for maintaining a fluid tight between said valve housing component and said sleeve component, said second seal means configured to circumferentially engage said exterior sealing surface of said valve housing component and said sleeve component adjacent said second end; and (g) said valve housing component, said sleeve housing component, said first seal means, and said second seal means enclosing said lateral opening and defining a complete, fluid tight valve body.

* * * * *